July 10, 1934.　　　　C. W. VOGT　　　　1,965,616
AUTOMATIC CONTROL OF THE PROCESSING OF MATERIALS
Filed Oct. 15, 1930　　2 Sheets-Sheet 1
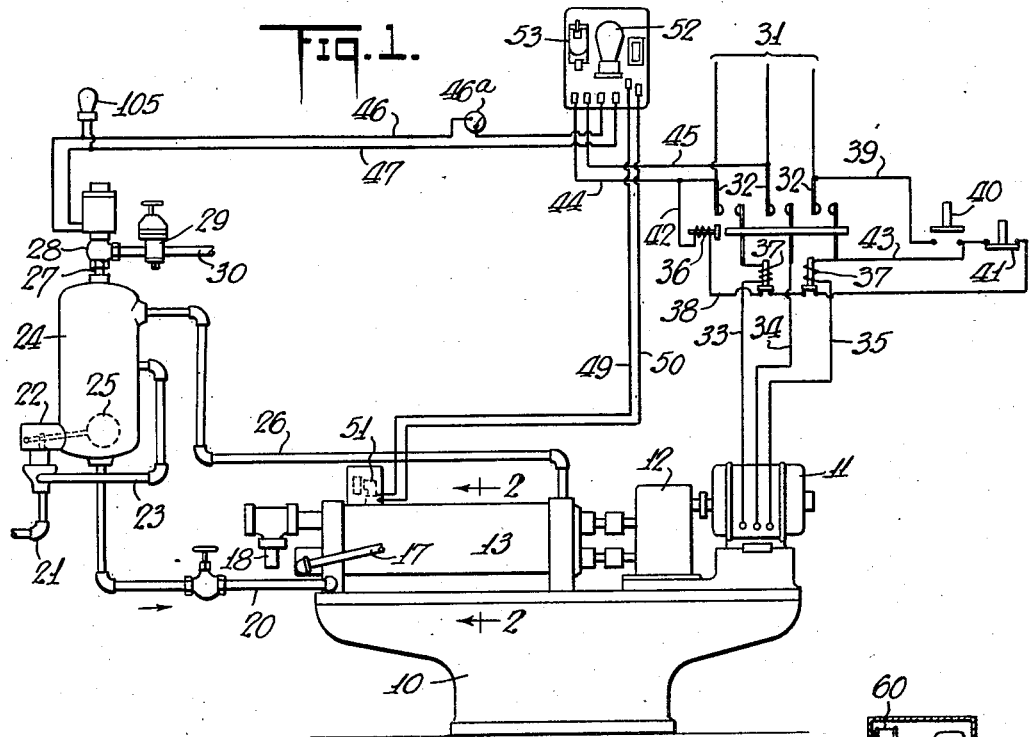
INVENTOR
Clarence W. Vogt
BY
ATTORNEYS

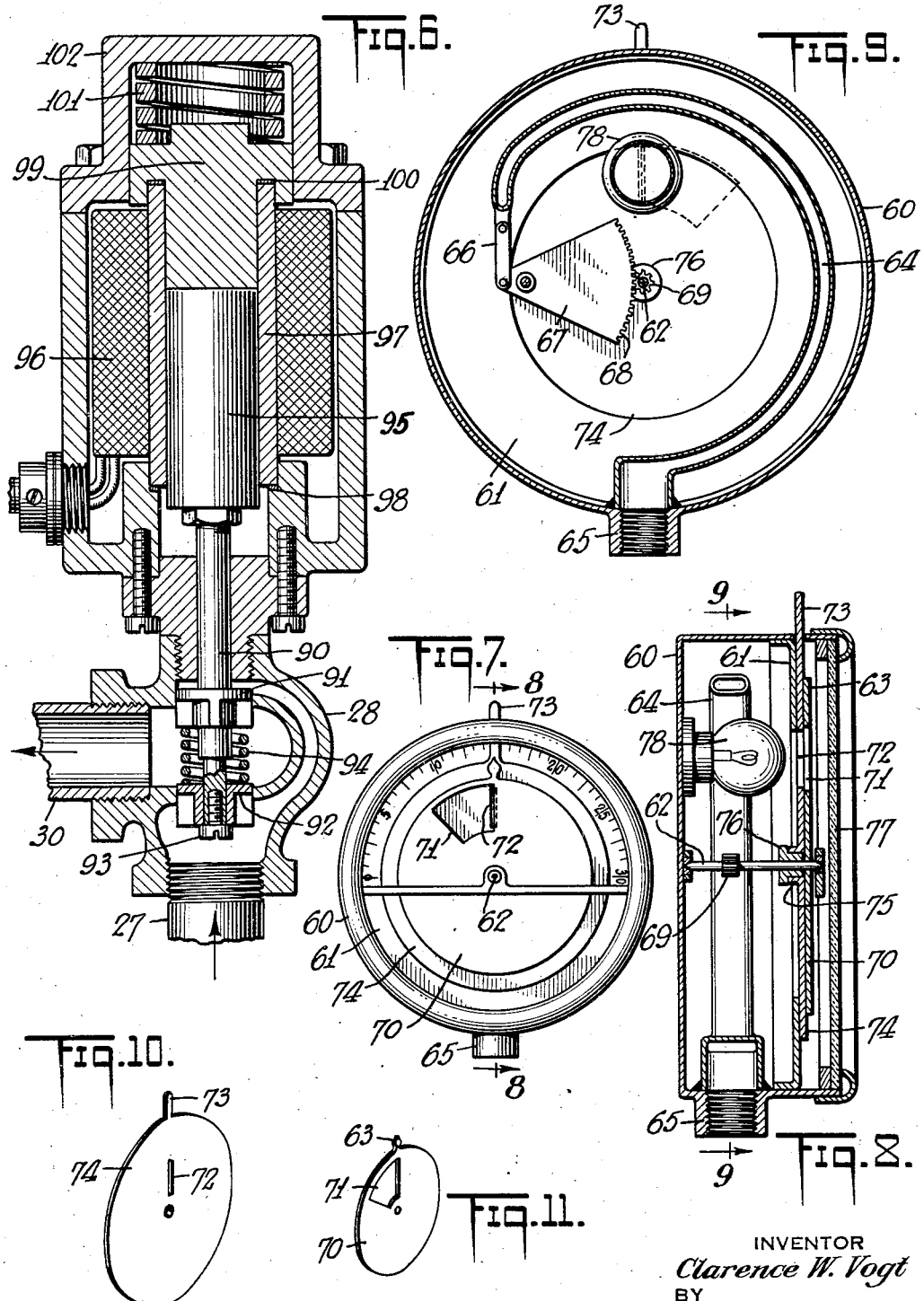

Patented July 10, 1934

1,965,616

UNITED STATES PATENT OFFICE 1,965,616

AUTOMATIC CONTROL OF THE PROCESSING OF MATERIALS

Clarence W. Vogt, Louisville, Ky., assignor, by mesne assignments, to Vogt Processes, Incorporated, Louisville, Ky., a corporation of Delaware Application October 15, 1930, Serial No. 488,809

19 Claims. (Cl. 62—4)

This invention is applicable to a wide variety of processes or apparatus in which it is desired to maintain as nearly as possible a uniform condition of the material in or while passing through some part of the apparatus or some step in the process.

The main object of the invention is to reduce to a minimum the variations from a predetermined condition, of a factor to be controlled in the process. By the term "controlled factor" I include resistance to agitation or advancement through some part of the process or processing apparatus, the temperature of the material being processed at any point or points in the apparatus, and/or the pressure to which the material is subjected in some step of the process or some part of the apparatus. Merely as an example of apparatus and processes to which the invention is applicable I refer to my prior Patents 1,783,864, 1,783,866, 1,783,867, 1,911,731 and 1,940,473. In said patents there are disclosed processes and apparatus in which a material, such for instance as lard compound, margarin or other comestible, is continuously delivered through a processing chamber in which it is subjected to the action of a temperature changing medium, whereby the material is partially solidified, hardened or converted from a liquid to a plastic condition.

In order to maintain uniformity it is necessary that the apparatus be automatically controlled, and in said patents I have disclosed several forms of controlling apparatus which may be employed. The supply of the temperature changing medium, the temperature of said medium, the supply of the material to be processed, and the temperature of the material to be processed, may be varied in order to secure the desired or uniform condition of the delivered material.

Although my present invention may be utilized with other forms of apparatus and in connection with the processing, circulating or delivering of other materials, I will hereinafter refer to certain specific embodiments of my invention and to a form of apparatus shown in my prior patents merely as an example and for purposes of illustration.

By means of my invention I secure a far greater sensitivity of the control and the maintenance of such control within relatively close limits and with the minimum time lag in effecting the complete cycle of the necessary control operation. As an example, if it is desired to discharge the material from a processing apparatus at a temperature of 20° F. the control will function when the temperature of the material varies in either direction by a fraction of a degree from the desired 20° F.

In most apparatus with which I am familiar and which has been proposed for the maintenance of a predetermined condition, the member which moves in accordance with variations in the temperature, pressure, plasticity or other controlled factor, is required to do an appreciable amount of work, such as to make an electric contact or build up a fluid pressure to operate the control means. This interposes an additional time lag due to the additional effort required and in direct proportion thereto. During this time lag the temperature, pressure or plasticity variation may continue to progress from the desired control point, and thus the total variation from the predetermined condition, before the corrective has been applied, is often so great as to cause undesirable variations in the physical characteristics of the product.

It has been proposed to use a flexible galvanometer needle suspended under a bar which at intervals of never less than several seconds is brought into contact with the needle to momentarily lock the latter and determine whether or not the control mechanism is to be called upon to function. In such apparatus the control is intermittent instead of continuous and the locking of the needle and the subsequent releasing causes a greater floating or swinging effect, and dampening devices to reduce this swinging effect cause a slowing up of the galvanometer and a lengthening of the time required to reach its correct position.

In my improved apparatus the member which moves in accordance with changes in the condition of the material being processed is not called upon to do any work or to make or break contact with any other part. Thus the resistance to its movement is reduced to a minimum and there is the minimum time lag in applying the corrective.

As one of the main features of my improved apparatus I employ means, such as a photoelectric element, which is adapted to be actuated by light rays to effect the control of the operating means. The control element which moves in accordance with varying conditions of the material being processed operates to vary the effective action of light rays upon said photoelectric element, but does not in itself mechanically actuate any part or directly make or break any electric contact.

In the accompanying drawings I have illustrated certain embodiments of my invention, but it will be apparent that various changes may be made in the details of construction and the arrangement of parts within the spirit of my invention and without departing from the scope of the appended claims.

In these drawings:

Fig. 1 is a side elevation of an apparatus such as shown in my prior Patent 1,940,473 and showing diagrammatically a wiring diagram for the refrigerant control in accordance with my present invention, Fig. 2 is a transverse section of the processing apparatus taken on the line 2—2 of Fig. 1 and upon a somewhat larger scale, Fig. 3 is an enlarged view similar to a portion of Fig. 1, but on a larger scale and showing the control element connected indirectly to the motor circuit, whereby the apparatus is controlled in accordance with the power requirement of the apparatus, Fig. 4 is a view somewhat similar to a portion of Fig. 3, but in which the control element is operated in accordance with variations in the pressure in the pipe supplying material to the processing apparatus, Fig. 5 is a view somewhat similar to Figs. 3 and 4, but in which the control element is operated in accordance with variations in the temperature of the material delivered by the processing apparatus, Fig. 6 is a central longitudinal section through the refrigerant control valve shown in Fig. 1, but on a larger scale, Fig. 7 is a front view of an indicating instrument for registering the temperature, pressure or electric current, Fig. 8 is a central vertical section on the line 8—8 of Fig. 7.

Fig. 9 is a section on the line 9—9 of Fig. 8, but on a somewhat smaller scale, and Figs. 10 and 11 are perspective views of portions of the instruments shown in Figs. 7, 8 and 9, but on a still smaller scale.

I have illustrated my invention as applied to a processing apparatus in which there is provided a base 10 which supports an electric motor 11, a gear casing 12 and a casing 13 enclosing the processing chambers. In the type illustrated there are four of these processing chambers 14 in the form of parallel tubes connected together in series. Within each chamber is an agitator shaft 15 carrying agitator blades 16. The several shafts are driven by the motor 11 through suitable gears within the gear casing 12.

The material to be processed is supplied to the processing chambers through a supply pipe 17, preferably by means of a pump, not shown, and is finally discharged through an outlet 18 into any suitable container.

Surrounding each of the processing chambers is a space 19 supplied with temperature changing medium from an intake pipe 20. The temperature changing medium may vary in accordance with the character of the material treated and the nature of the processing carried on.

For low temperature processing it is preferable to use ammonia which may be supplied from the ammonia receiver, not shown, of any suitable type of refrigerating apparatus. It is shown as being supplied through a pipe 21 past an expansion valve 22 and a pipe 23 to an accumulator 24. The expansion valve 22 is operated by a float 25 within the accumulator and serves to maintain a supply of liquid refrigerant in the accumulator at a substantially constant level. The pipe 20 previously referred to leads from the bottom of the accumulator while a pipe 26 leads from the opposite end of the refrigerant space 19 to the upper part of the accumulator. Thus the refrigerant evaporated by the processing of the material together with any unevaporated refrigerant is returned to the accumulator. The evaporated refrigerant leaves the accumulator through an outlet pipe 27 past a valve 28 which is automatically controlled by the apparatus hereinafter described and which involves one of the main features of my invention. The refrigerant gas also passes a pressure control valve 29 before entering the return line 30 which goes back to the compressor.

None of the features so far described involves any novel features of my present invention with the exception of the automatic control valve 28.

In the pipe 26 there is preferably employed an automatic solenoid operated valve of the type disclosed in my prior Patent 1,940,473 and which may serve as a primary control within wide limits, and the control valve 28 of the present invention serves to control any relatively narrow limits.

For simplicity I have not illustrated such a control valve in the pipe 26 as it is illustrated and described in the last mentioned patent.

For controlling the electric motor I have illustrated diagrammatically substantially the same wiring circuit as shown in my Patent 1,940,473. The motor is assumed to be a three phase alternating current motor and is supplied with electric current from a main supply line 31 by means of line contactors 32 and power lines 33, 34 and 35. A solenoid 36 serves when energized to close the line contactors 32 to supply current to the motor. In each of the lines 33 and 35 there is placed an overload relay 37 adapted to open contactors in a line 38 when the motor current is above a predetermined value. Power to operate the solenoid 36 is supplied from one of the main power lines 31 through a line 39, a normally open start push button 40, a normally closed push button 41, the line 38 controlled by overload relays 37 and connected with the solenoid 36 through a return line 42 which latter is connected to one of the main supply lines 31. A line 43 connects one terminal of the start push button 40 with one terminal of the main line contactors 32.

By this wiring the motor may be started by a momentary operation of the push button 40 and thereafter will be operated by means of the current through the line 43 until the stop push button 41 is operated or one of the overload relays 37 opens the circuit to the solenoid 36.

As previously noted this wiring diagram for the control of the motor forms no portion of the present invention and it is illustrated to facilitate a clear understanding of the operation and control of the driven motor of the processing apparatus.

In carrying out my invention I employ a photoelectric cell, means controlled thereby for operating the valve 28 and means operated in accordance with variations in the condition of the material being processed for controlling the application of light rays to the photoelectric cell. The details of this cell and the parts directly associated therewith may vary within wide limits. For instance, I may employ a standard make of cell and photoelectric relay such as that described in General Electric Company's bulletin No. CR7505. The cell may be mounted in any desired position, but for convenience may be placed directly upon the casing of the processing chamber. The relay parts may be mounted at some other position. As shown wires 44 and 45 lead from two of the current supply lines 31 and give the necessary voltage and current to activate the relay. Wires 46 and 47 connect the relay with the solenoid valve 28. Wires 49 and 50 connect the photoelectric tube to the amplifying tube circuit of the relay tubes. The photoelectric tube is not shown, but is disposed within a hood 51 shown in Figs. 1, 3, 4 and 5. A snap switch 46a may be provided in the line 46.

In my improved apparatus a change in the condition of the material being processed varies the light rays entering the hood 51 to the photoelectric cell and this actuates the relay to supply current to the line 46, 47 and energizes the solenoid of the valve 28. The current from the photoelectric cell is amplified by an amplifying tube 52 so that it will be sufficient for the actuation of a contactor 53 to close the circuit through the wires 46, 47. The contactor is operated by a relay, not shown. When the circuit is closed by the relay and contactor, the wires 46, 47, receive current directly from the supply lines 31 through wires 44, 45.

Adjacent to the photoelectric cell there is provided a source of light and means for controlling the action of the light rays on the cell. The light may be of any suitable character and if electric may receive its current from any suitable source. The means which controls the action of the light rays on the cell may be modified in accordance with varying conditions in the processed material, such for instance as the resistance to movement, temperature or pressure as hereinbefore referred to.

In Fig. 3 I have illustrated somewhat diagrammatically an arrangement in which the resistance to movement of the material is utilized as the controlled factor, in Fig. 4 I have shown an apparatus in which the variation in pressure in the supply line is the controlled factor, and in Fig. 5 I have illustrated one in which the temperature of the outgoing material is the controlled factor.

The apparatus shown in Figs. 7 to 11 inclusive may be employed irrespective of the character of the controlled factor, if corresponding changes be made to operate it in accordance with current, temperature or pressure variations. The specific instrument illustrated is adapted to operate in accordance with pressure variations. In this instrument there is employed a suitable casing 60 having a dial 61 which may be calibrated within the range limits of the variations which may take place in the process. The dial illustrated in Fig. 7 is calibrated for pressure from 0 to 30, but obviously calibrations may be finer or coarser and extend through a greater or lesser range. The dial is shown as an annular flange secured to the peripheral wall of the casing. Mounted in the casing and preferably on jeweled or frictionless bearings is a suitable shaft 62. The front bearing is shown in a bar in front of the dial. The shaft carries a pointer 63 movable along the dial.

Any suitable means may be employed for oscillating the shaft and pointer in accordance with the pressure variations. Merely as an example I have illustrated a Bourdon tube 64, one end of which is connected to a coupling 65 for connection to a conduit or port leading to the portion of the apparatus in which the pressure is to be controlled. This Bourdon tube is so connected to the shaft that comparatively small variations in pressure will give comparatively wide swings of the pointer. As an example the inner end of the tube is connected by a link 66 to one end of a lever 67 journaled intermediate of its ends, preferably on jeweled bearings. One end of this lever is formed as a sector 68 meshing with a pinion 69 on the shaft 62. By varying the relative lengths of the two end portions of the lever the swing of the pointer in respect to any predetermined pressure variation may be obtained.

These parts of the instrument shown in Figs. 7 and 8 and so far described may be varied within wide limits as the specific details of the parts constitute no novel feature of the invention.

As one important feature of the invention I control the application of light rays to the sensitive tube by the oscillation of the shaft 62. As a simple and convenient arrangement the pointer and shaft have a disc 70 connected thereto, the disc being provided with a comparatively large aperture or window 71 through which light may pass. The disc 70 and the pointer 63 may be formed integral as shown in Fig. 11. In the rear of the disc and pointer is mounted a disc 74 shown particularly in Fig. 10. It is mounted concentric with the dial, but free of the shaft 62, and has a comparatively narrow radial slot 72 which may be moved to a position corresponding to that at which the control is to be maintained. As shown it has a hub 75 journaled in a bar or other support 76.

Any suitably means may be employed for adjusting or setting the disc 74. For instance, a handle 73 may extend through the peripheral wall of the casing and form an extension of the disc.

The width of the slot 72 should be merely sufficient to permit the passage of light rays of sufficient intensity to actuate the photoelectric cell. The slot 71 may be of any desired width, but is preferably considerably wider than the slot 72 so that if the pressure increases to any considerable extent beyond the limit set by the position of the slot 72, the latter will not be covered by the rear edge of the slot 71 and shut off the light rays.

The light should be placed upon one side of the pair of discs 70, 74 and the photoelectric cell upon the opposite side. From an apparatus standpoint it is immaterial which is within the casing and which is outside and from a construction standpoint it is preferable to have the photoelectric cell inside of the casing so that the source of light may be of any character and at any distance from the instrument. Merely to facilitate illustration I have shown the photoelectric cell mounted outside of the casing in front of a crystal 77 and have shown within the casing an ordinary electric light bulb 78 supported in any suitable manner adjacent to the disc 74 and energized from any suitable source.

In the operation of this instrument the slots 72 and 71 will be out of registry when the pointer 63 is below the predetermined pressure which it is desired to maintain. As the pressure increases and the pointer moves along the dial the slot 71 will come into registry with the slot 72 when the predetermined pressure has been attained. The flow of light through the registering slots will activate the photoelectric cell which through the amplifying tube relay and contactors will close the circuit through the line 46, 47 and operate the valve 28, a preferred form of which valve will be hereinafter described.

The opening of the valve will reduce the temperature of the refrigerant and thereby cause a reduction in the hardening effect on the material being processed. This will reduce the pressure required to advance the material through the processing chamber and the pointer and disc 70 will move in the opposite direction to shut off the light rays to the photoelectric cell. The valve 28 will thereupon drop to its open position and the refrigerating effect will increase.

The desired condition of operation is one in which the slot 71 overlaps the slot 72 to an extremely slight extent and very slight variations in the position of the slot 71 cause a variation in the light intensity such that the valve 28 opens and closes at very frequent and regular intervals and the degree of hardening and therefore pressure varies through an extremely narrow range.

These opening and closing movements of the valve may be at the rate of one a second as no mechanical work is done by the disc 70 in its oscillations, no contacts are made and broken directly by this disc, no measurable resistance is interposed to its free oscillations within narrow limits upon minute variations in pressure, and no appreciable lag is encountered between the successive movements in opposite directions.

The flow of light, the energizing and de-energizing of the photoelectric cell, and the flow of current to the solenoid valve 28 all take place in the fraction of a second.

In Fig. 4 I have illustrated the instrument shown in Figs. 7 to 11 inclusive as mounted upon the supply pipe leading to the processing chamber. Of course, the instrument may be connected to any pipe or part of the apparatus which is subjected to pressure variations and may be directly on the pipe or part containing the fluid under pressure and which is to be controlled or may be at any remote position and connected thereto by a suitable fluid pressure conduit.

In Fig. 5 I have illustrated an arrangement which may be employed where the instrument is to be operated in accordance with variations in the temperature of a material which is to be processed or which is undergoing processing or which has been processed. The outlet conduit 18 leading from the processing chamber is illustrated as having disposed therein a pyrometer element or other suitable thermocouple or electric thermometer element 80 which may be of any suitable character and which will vary the flow of electric current in accordance with variations in the temperature to which it is subjected. Wires 81, 82 lead from this pyrometer element to the instrument.

It will, of course, be obvious that in such an instrument instead of having a Bourdon tube which operates in accordance with variations in the pressure, there may be employed other means which will cause oscillations of the pointer 63 carried by disc 70, or other equivalent means for indicating the temperature and for controlling the application of light rays to the photoelectric cell.

In Fig. 3 I have illustrated an arrangement in which the resistance to agitation or advancement is the controlled factor. For instance, the same type of instrument used in connection with temperature control may be employed, but in which suitable means are employed in place of the Bourdon tube and controlled by the variations in electric current to oscillate the pointer and disc. Instead of connecting the wires from the instrument to a pyrometer element, wires 83, 84 may lead to an induction coil, the secondary 85 of which may be juxtaposed to a primary coil 86 in one of the lead lines 33 to the motor 11.

If the apparatus be used in connection with a refrigerating process an increase in refrigeration will increase the hardness of the material and thereby increase the resistance to agitation or advancement. This increased resistance will increase the load on the actuating motor 11 and the induction coils 85, 86 will cause an increase flow of current in the lines 83, 84 and the actuation of the pointer and disc 70.

It will, of course, be obvious that suitable changes will be made in the instrument depending upon whether the instrument is to maintain a minimum or maximum temperature, pressure or resistance. For preventing the pressure rising above a predetermined limit the normal position of the slot 71 should be on the lower side of the slot 72. For preventing the material from decreasing below a predetermined temperature the normal position of the slot 71 should be on the high temperature side of the slot 72. Corresponding changes will be made depending upon whether the fluid used in the processing be one which applies heat, such for instance as steam, or whether it extracts heat, such for instance as a refrigerating fluid.

Although the instrument preferably has a pointer whereby the operator may read the temperature, pressure or resistance upon a suitable scale, the pointer itself may be omitted if it is not necessary or desirable to make such readings.

The use of a calibrated scale is important in order that the slot 72 may be properly positioned to maintain the desired condition of the controlled factor.

If the apparatus is to be used for controlling the effective action of a refrigerating fluid I find it advantageous to make the valve 28 of the type illustrated in Fig. 6. This valve involves certain important novel structural features.

In the form illustrated the valve 28 is of the balanced type and includes a valve stem 90 having a pair of valve plates 91 and 92 in separate ports in parallel between the conduits 27 and 30. The valve plate 91 is rigidly secured to the valve stem so as to open and close only upon reciprocation of the valve stem. The valve plate 92 is slidable upon the valve stem and normally tends to occupy a position adjacent to stop 93 on the valve stem. The valve plate 92 is loaded so as to automatically open upon a predetermined pressure difference in the pipes 27 and 30. The loading may be due to the weight of the valve itself or the weight may be supplemented by a compression spring 94. The valve plate 92 opens by an upward movement against the spring, while both valve plates open upon a downward movement of the valve stem. The valve stem 90 is connected to the core or plunger 95 of a solenoid 96. Between the core 95 and the coil of the solenoid 96 is a sleeve 97 serving to seal the apparatus against the escape of ammonia. The sleeve is free to expand and contract with temperature variations as it is pressed against a stationary seat 98 at the lower end, and by a slide 99 at the upper end and which also has a seat 100. The slide is pressed down by a sleeve coil spring 101 mounted in a hood or cap 102. The slide 99 preferably has a portion projecting into the sleeve to form a stop or upper limit for the movement of the core and to reduce the heating effect during the time the solenoid is energized.

The valve 29 may be adjusted to prevent the accumulation of a back pressure in the accumulator in excess of a predetermined amount when the ammonia compressor is functioning. For instance, this valve may be set to maintain a back pressure of 3 pounds gauge in the accumulator and the refrigerating space of the processing apparatus. The loading of the valve plate 92 may be such as to increase the back pressure to the extent of, for instance, 1 pound. With the solenoid energized and the valve plate 91 in closed position the back pressure in the accumulator and refrigerating space of the processing apparatus will therefore be maintained at 4 pounds gauge. If this pressure tends to increase the valve plate 92 will open and the pressure will decrease to the said substantially 4 pounds gauge pressure limit. If the control instrument is actuated to de-energize the coil 96, the valve plates 91 and 92 will drop to open position thereby removing the loaded valve 92 from the path of flow and permitting the back pressure in the accumulator and refrigerating space to drop to 3 pounds. The valve plate 92 is preferably of the same size as the valve plate 91 so as to maintain a balanced action and it is of such size that when opened against its loading it will provide sufficient port area to permit the ready flow of the entire amount of refrigerant gas being evolved in the processing apparatus and the accumulator.

Changing the back pressure in the evaporator from 3 pounds gauge to four pounds gauge causes a change in the temperature within the evaporator of approximately 2° F., if ammonia be the refrigerant employed. Saturated ammonia vapor at 4 pounds gauge pressure has a temperature of −19.2° F., while saturated ammonia vapor at 3 pounds gauge pressure has a temperature of −21.2° F. Thus when the solenoid is energized, the temperature of the refrigerant will be maintained at a temperature of 2° higher than it will when de-energized. If a wider temperature range than 2 pounds is to be maintained the valve plate 92 may be loaded to a greater extent, and if the control is to be maintained in any desired different temperature range, the back pressure valve 29 may be correspondingly adjusted.

In the construction illustrated energizing of the solenoid closes the valve plate 91 and brings the valve plate 92 into operative position. Where a different type of temperature changing medium is employed, or where the control instrument is differently designed, or where the temperature of the processed material is to be kept up to a predetermined pressure or temperature, the valve mechanism may be designed so that the energizing of the solenoid opens the valve plate 92 and de-energizing causes it to close.

It will be noted that the valves 29 and 92 are automatic back pressure valves arranged in series and operating independent of the solenoid. The valves 91 and 92 are in parallel and may be simultaneously operated by the solenoid. The valve 29 may be of the ordinary diaphragm type with a manual adjustment to set the maximum back pressure at any point desired.

In practice it is preferable to employ a pilot light 105 across the line 46, 47 to serve as an indicator as to the open or closed position of the control valve. The continuous blinking of this light shows to the operator that the apparatus is properly functioning within the control range. When the light remains on it indicates that the apparatus is outside of the control range on one side of the latter, and when it remains off for any considerable period it means that the apparatus is outside of the control range in the other direction.

With a process of the type shown in my prior patents above referred to, the material to be processed, such for instance as a lard compound, may be delivered through the apparatus at the rate of 6000 pounds per hour. With the accumulator 24 having a gas space of approximately 2 cubic feet and a processing unit of the capacity above referred to, there will be approximately 120 cubic feet of gas evaporated per minute, at 3 pounds gauge pressure. Therefore the momentary closing of the valve 28 for 1/20 of a second will cause an increase of pressure of 1 pound and a corresponding increase in the boiling temperature of the refrigerant of approximately 2° F. Thus, it will be seen that by means of my improved apparatus the control may operate at a very rapid rate and maintain a controlled factor within a far narrower range than has been possible.

Having thus described my invention, what I claim as new and desire to secure by Letters Patent is:

1. A method of controlling the processing of a material, which includes varying the effective action of light rays on a light sensitive element in accordance with variations in the pressure to which the material being processed is subjected, and automatically operating a pressure controlling member in accordance with variations in the activation of said element.

2. A method of controlling the processing of a material to vary the plasticity thereof which includes varying the effective action of light rays on a light sensitive element in accordance with variations in the resistance to movement of the material being processed, and automatically varying the plasticity in accordance with variations in the activation of said element.

3. A method of processing material which includes continuously advancing the material, subjecting the material during advancement to the action of a temperature changing medium, varying the effective action of light rays on a light sensitive element in accordance with variations in the condition of the material being advanced, and automatically controlling the effective action of the temperature changing medium in accordance with variations in the activation of said element.

4. A method of processing material which includes continuously advancing the material, subjecting the material during advancement to the action of a temperature changing medium, varying the effective action of light rays on a light sensitive element in accordance with variations in the temperature of the material being advanced, and automatically controlling the effective action of the temperature changing medium in accordance with variations in the activation of said element.

5. A method of processing material which includes continuously advancing the material, subjecting the material during advancement to the action of a temperature changing medium, varying the effective action of light rays on a light sensitive element in accordance with variations in the resistance to be overcome in effecting the advancement of the material, and varying the effective action of the temperature changing medium in accordance with variations in the activation of said element.

6. A method of processing material which includes continuously advancing the material, subjecting said material during advancement to the action of a temperature changing medium, varying the effective action of light rays on a light sensitive element in accordance with variations in the pressure required to effect advancement of the material, and varying the effective action of the temperature changing medium in accordance with variations in the activation of said element.

7. A method of processing material including subjecting the material to the action of a temperature changing medium, agitating said material, varying the effective action of light rays on a light sensitive element in accordance with variations in the resistance offered by said material to agitation, and varying the effective action of the temperature changing medium in accordance with variations in the activation of said element.

8. A method of processing a comestible material, which includes continuously advancing the material, subjecting it to the action of a refrigerating medium during said advancement, varying the effective action of light rays on a light sensitive element in accordance with variations in the temperature of the material being processed, and varying the effective action of the refrigerating medium in accordance with variations in the activation of said element.

9. A method of processing a comestible material, which includes continuously advancing it, subjecting it during advancement to the action of a volatile refrigerant, varying the effective action of light rays on a light sensitive element in accordance with the resistance offered by said material to advancement, and varying the back pressure on the refrigerant in accordance with variations in the activation of said element.

10. An apparatus for processing material including means for subjecting said material to the action of a refrigerating medium to change the plasticity thereof, a photoelectric cell, means for varying the activation of said cell in accordance with variations in the pressure of the material under process, and means for varying the effective action of the refrigerating medium in accordance with variations in the activation of said cell.

11. An apparatus for processing material including means for agitating the material, a photoelectric cell, means for varying the activation of the cell in accordance with variations in the resistance encountered by said agitating means, and means for controlling a condition of the material in accordance with variations in the activation of said cell.

12. An apparatus for processing material including means for continuously advancing the material, means for subjecting the material to the action of a refrigerating medium during advancement, means for agitating the material, a photoelectric cell, means for varying the activation of said cell in accordance with a condition of the material being processed, and means for varying the effective action of said medium in accordance with variations in the activation of said cell.

13. An apparatus for processing material including means for continuously advancing the material, means for subjecting the material to a temperature changing medium during advancement, means for agitating the material, a photoelectric cell, means for varying the activation of said cell in accordance with resistance to movement of the material being processed, and means for varying the effective action of said refrigerating medium on the material being processed in accordance with variations in the activation of said cell.

14. An apparatus for the processing of material including a processing chamber, means for refrigerating the material in said chamber, means for agitating the material in said chamber, a photoelectric cell, means for varying the activation of said cell in accordance with variations in the resistance to agitation of the material in said chamber, a valve for controlling the effective action of the refrigerating medium, and means for operating said valve in accordance with variations in the activation of said cell.

15. A mechanism for maintaining substantially uniform the pressure of a moving plastic material, which includes a photoelectric cell responsive to variations in the pressure of successive portions of said material, and means responsive to the activation of said cell for maintaining said pressure substantially constant.

16. A refrigerating system having an evaporator, an automatic back pressure valve on the low pressure side of the evaporator, and an automatically operated valve interposed between said back pressure valve and said evaporator and adapted to increase the pressure in the evaporator by a predetermined amount over the pressure which the back pressure valve is set to maintain.

17. A refrigerating apparatus including an evaporator, a pair of automatic back pressure valves arranged in series on the low pressure side thereof, and separate automatic means for rendering ineffective the valve nearest to the evaporator.

18. A refrigerating system including an evaporator, an automatic back pressure valve on the low pressure side thereof, a pair of valves arranged in parallel between said back pressure valve and said evaporator, one of said valves adapted to open automatically upon a predetermined difference in pressure upon opposite sides thereof, and means for positively opening both of said last mentioned valves.

19. A refrigerating system including an evaporator, a pair of valves in parallel upon the low pressure side thereof, one of said valves being adapted to automatically open upon a predetermined pressure difference upon opposite sides thereof, and means automatically controlled in accordance with variations in the condition of the material subjected to the action of refrigerant in the evaporator for positively operating both of said valves.

CLARENCE W. VOGT.